US007635952B2

(12) United States Patent
Takeda et al.

(10) Patent No.: US 7,635,952 B2
(45) Date of Patent: Dec. 22, 2009

(54) LIGHTING CONTROLLER FOR LIGHTING DEVICE FOR VEHICLE

(75) Inventors: Hitoshi Takeda, Shizuoka (JP); Toru Nakayama, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 411 days.

(21) Appl. No.: 11/581,610

(22) Filed: Oct. 16, 2006

(65) Prior Publication Data

US 2007/0085494 A1 Apr. 19, 2007

(30) Foreign Application Priority Data

Oct. 19, 2005 (JP) ............................ 2005-304135

(51) Int. Cl.
*B60Q 1/34* (2006.01)
*H01K 7/00* (2006.01)

(52) U.S. Cl. .......................................... 315/80; 315/76

(58) Field of Classification Search ................. 315/312, 315/77, 80, 84.51, 307, 310, 291, 224, DIG. 2, 315/DIG. 4, 308, 309

See application file for complete search history.

(56) References Cited

U.S. PATENT DOCUMENTS

| | | | | |
|---|---|---|---|---|
| 6,417,624 | B1 * | 7/2002 | Ito et al. | 315/88 |
| 6,759,812 | B2 * | 7/2004 | Ito et al. | 315/291 |
| 6,914,395 | B2 * | 7/2005 | Yamauchi et al. | 315/308 |
| 7,244,036 | B2 * | 7/2007 | Murakami et al. | 362/20 |
| 2005/0047031 | A1 * | 3/2005 | Naito | 361/18 |
| 2005/0162858 | A1 * | 7/2005 | Shiotsu et al. | 362/509 |

FOREIGN PATENT DOCUMENTS

| | | |
|---|---|---|
| DE | 34 41 824 | 6/1985 |
| DE | 199 05 709 | 8/2000 |
| DE | 101 46 191 | 4/2003 |
| JP | 2-15597 | 1/1990 |
| JP | 10-302976 | 11/1998 |
| JP | 2004-51014 | 2/2004 |
| WO | WO-87/03548 | 6/1987 |

OTHER PUBLICATIONS

German Office Action issued in German Application No. 10 2006 049 291.9-31 dated Jan. 15, 2007 and English translation thereof, 14 pages.

* cited by examiner

*Primary Examiner*—Douglas W Owens
*Assistant Examiner*—Minh D A
(74) *Attorney, Agent, or Firm*—Osha • Liang LLP

(57) ABSTRACT

In a process in which a current is supplied from a switching regulator to multi-chip LEDs, the forward voltages of the LEDs are respectively detected in forward detecting circuits. The detected values are sent to a microcomputer. In the microcomputer, detected values when the multi-chip LEDs are initially turned on are stored as initial values. A first abnormality deciding value is set from the initial value. The detected values are sequentially stored as updated values. Second abnormality deciding values having conditions stricter than those of the first abnormality deciding value are sequentially set in accordance with the stored updated value. A read value is compared with the first abnormality deciding value or the read value is compared with the second abnormality deciding value to decide whether or not the abnormality of the LEDs is present. When it is decided that the LEDs are abnormal, an LED is turned on to inform a driver of the presence of the abnormality.

18 Claims, 10 Drawing Sheets

FIG. 4 (a)
FIG. 4 (b)
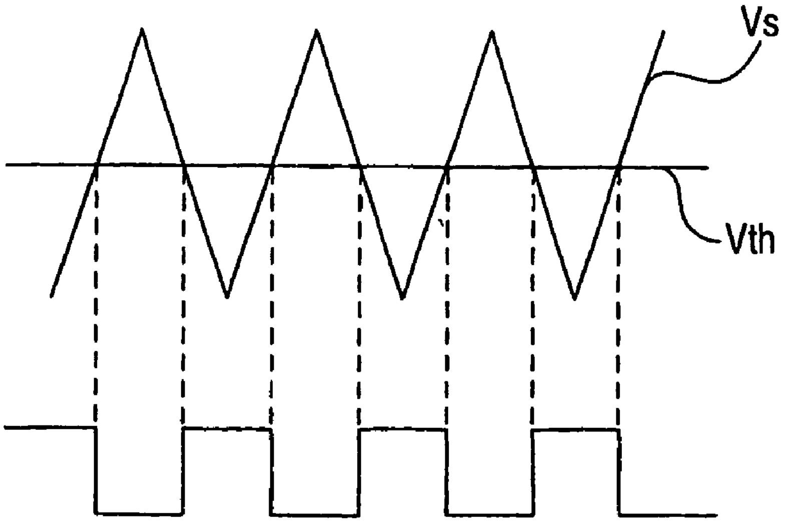
FIG. 4 (c)
FIG. 4 (d)
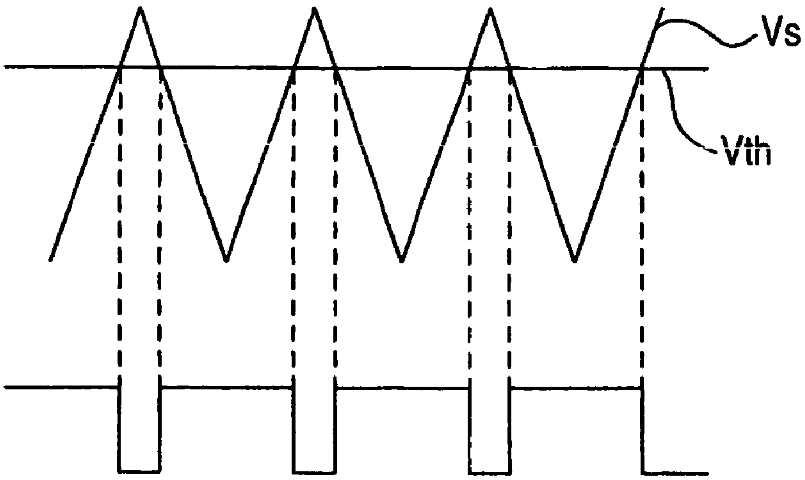
FIG. 4 (e)
FIG. 4 (f)
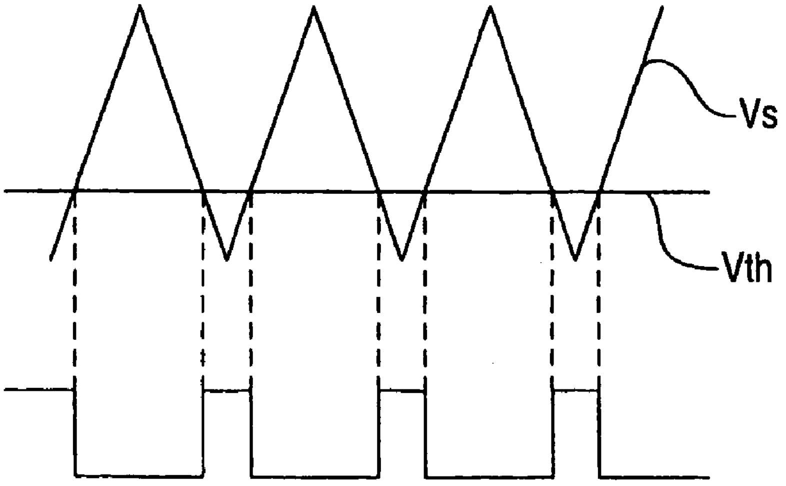

LIGHTING CONTROLLER FOR LIGHTING DEVICE FOR VEHICLE

BACKGROUND OF INVENTION

1. Field of the Invention

The present invention relates to a lighting controller for a lighting device for a vehicle, and more particularly to a lighting controller for a lighting device for a vehicle constructed so as to control the lighting operation of a semiconductor light source.

2. Background Art

As a lighting device for a vehicle, lighting devices using semiconductor light emitting element such as an LED (Light Emitting Diode) as a light source have been known. On such a lighting device for a vehicle, a lighting control circuit for controlling the lighting operation of the LED is mounted.

As the lighting control circuit, for example, a lighting control circuit has been proposed in which the battery voltage of the vehicle is boosted and the boosted voltage is applied to LEDs to drive the light source having a plurality of the LEDs connected in series (see Patent Document 1).

As the LED of the lighting device for a vehicle of this type, a signal chip LED having a package in which one chip is accommodated, or a multi-chip LED having a package in which a plurality of chips are accommodated, is employed. When an abnormality due to the failure of the LEDs, for instance, a short-circuit or a disconnection of the LED is detected, a method for detecting the forward voltage Vf of the LED is employed. In this case, when the abnormality of the light source in which a plurality of single chip LEDs are connected in series is detected, an accuracy for detecting the abnormality can be increased in detecting the forward voltages Vf of the individual LEDs than in detecting the forward voltage Vf of all the LEDs (the total forward voltage Vf) connected in series.

However, when the abnormality of the muti-chip LED is detected, it is difficult to detect the forward voltages Vf of the individual chips accommodated in the package. In the multi-chip LED in which the four chips are connected in series, it is a limitation to detect the total forward voltage Vf of the four LED chips. Further, when an variation of the forward voltages Vf is considered, the abnormality is hardly accurately detected.

For instance, in the case of the multi-chip LED in which the four chips are connected in series, if the variation of the forward voltage per chip is 3 to 4 V, the variation of the forward voltage Vf of the LED package during a normal time is 12V to 16V. When one chip of the multi-chip LED having the variation of the forward voltage Vf of 16 V is failed due to a short-circuit, the total of the forward voltage Vf is 12 V. However, this value is located within a range of the variation and, thus, the multi-chip LED cannot be discriminated from a normal multi-chip LED. Accordingly, in such a case, it is impossible to detect that one chip is short-circuited.

However, in this case, when the multi-chip LEDs are previously classified and ranked in view of the forward voltage Vf because the variation of the forward voltage Vf per rank is decreased, the abnormality can be detected. As a consequence, to meet the classification or the ranking of the forward voltage Vf, the number of types of the abnormality detecting circuit is increased and the number of managing and developing processes is increased, which cause cost to be increased.

Further, when the LED fails, the forward voltage Vf of the LED chip does not necessarily become 0V, and the forward voltage Vf may be gradually lowered. For example, in a case that a supply voltage applied to a lighting control circuit is suddenly varied, a chattering phenomenon may be generated in an output path for connecting the lighting control circuit to the LED to supply a rush current to the LED and generate a current concentration on the LED; a gradual deterioration of the LED may occur due to an environmental change such as a temperature change; or a combination thereof may occur.

When the forward voltage Vf is gradually lowered to lead to the failure of the LED, the variation of the forward voltage Vf needs to be considered to accurately detect the abnormality of the LED in the direction of the short-circuit (leak). With respect to the variation of the forward voltage Vf, a "solid difference of the LED," "temperature characteristics of the forward voltage Vf" and "V-I characteristics" are exemplified.

Thus, when the abnormality of the LED in the direction of the short-circuit (leak) direction is accurately detected, several methods may be used. For example, in one method, when a prescribed current is supplied to an electric lamp, voltage of both the ends of the electric lamp is detected and the detected voltage is compared with a previously stored voltage to detect the abnormality of the electric lamp (see Patent Document 2). In other methods, a lamp voltage when a lamp is stable or a rate of rise of the lamp voltage during an initial time to start to light is previously stored in a nonvolatile memory as an initial rate of rise of the lamp voltage, then, a lamp voltage detected during the turning on of the lamp is compared with an initial lamp voltage, or a rate of rise of the lamp voltage during the turning on of the lamp is compared with the initial rate of rise of the lamp voltage to detect the life of the lamp (see Patent Document 3).

If the forward voltage Vf is previously stored, the stored forward voltage Vf is compared with the detected forward voltage Vf so that the largest "solid difference of the LED" due to variation of the forward voltage Vf can be cancelled.

Further, when the current supplied to the LED is fixed, the variation of the forward voltage Vf due to the "V-I characteristics" can be ignored.

[Patent Document 1] JP-A-2004-51014
[Patent Document 2] JP-A-2-15597
[Patent Document 3] JP-A-10-302976

SUMMARY OF INVENTION

In the method for simply comparing the previously stored forward voltage Vf with the detected forward voltage Vf, when a failure due to the change of the ambient temperature (an environment) is considered, if the forward voltage Vf is suddenly lowered or gradually lowered, the abnormality of the LED is hardly accurately detected. Especially, in the case of the multi-chip LED having four chips connected in series, time leading to a failure is different between the time when only one chip has failed and when all four chips have failed. Thus, the abnormality of the multi-chip LED is hardly detected.

In one or more embodiments, a lighting controller for a lighting device for a vehicle comprises: a current supply control unit for receiving a supply of an electric power from a power source and controlling the supply of a current to a single or a plurality of semiconductor light sources; a forward voltage detecting unit for detecting the forward voltage of the semiconductor light source; an initial value storing unit for storing as an initial value a detected value of the detected values of the forward voltage detecting unit that is obtained when the semiconductor light source is initially turned on; an updated value storing unit for storing the latest detected value of the detected values of the forward voltage detecting unit as an updated value; a first deciding unit for comparing a first abnormality deciding value set from the initial value with the detected value of the forward voltage detecting unit to decide whether or not the abnormality depending on the change of the forward voltage of the semiconductor light source is present; and a second deciding unit for setting a second abnormality deciding value having a condition different from that of the first abnormality deciding value in accordance with the updated value stored in the updated value storing unit and comparing the set second abnormality deciding value with the detected value of the forward voltage detecting unit to decide whether or not the abnormality depending on the change of the forward voltage of the semiconductor light source is present.

When the single or the plurality of semiconductor light sources are turned on, the forward voltage of the single or the plurality of semiconductor light sources is detected. During this process, the detected value obtained when the single or the plurality of semiconductor light sources are initially turned on is stored as the initial value and the latest detected value of set from the stored initial value. The detected value of the forward voltage is compared with the set first abnormality deciding value to decide whether or not the abnormality due to the change of the forward voltage of the semiconductor light source is present. The second abnormality deciding value having the condition different from that of the first abnormality deciding value is set in accordance with the stored updated value. The detected value of the forward voltage is compared with the set second abnormality deciding value to decide whether or not the abnormality due to the change of the forward voltage of the semiconductor light source is present. Accordingly, even when the forward voltage of the semiconductor light source is gradually lowered or suddenly lowered owing to the change of the environment of the single or the plurality of semiconductor light sources, for instance, the change of temperature, it is decided whether the detected value of the forward voltage deviates from the first abnormality deciding value or from the second abnormality deciding value, so that the abnormality due to the change of the forward voltage of the single or the plurality of semiconductor light sources can be highly accurately detected. In this case, when the first abnormality deciding value is set more loosely than the second abnormality deciding value, it can be decided that the forward voltage gradually progressively falls in accordance with the first abnormality deciding value, and that the forward voltage abruptly falls in accordance with the second abnormality deciding value.

In one or more embodiments, a lighting controller for a lighting device for a vehicle comprises: a current supply control unit for receiving a supply of an electric power from a power source and controlling the supply of a current to a plurality of semiconductor light sources; a forward voltage detecting unit for detecting respectively the forward voltages of the semiconductor light sources; a relative value calculating unit for calculating the relative values of the semiconductor light sources from the detected values of the forward voltage detecting unit; a relative value storing unit for storing an initial relative value calculated as an initial value upon initially turning on the semiconductor light source, of the relative values calculated by the relative value calculating unit or an updated relative value updated as the latest relative value of the relative values calculated by the relative value calculating unit; and a deciding unit for comparing the relative values calculated by the relative value calculating unit with the initial relative value or the updated relative value stored in the relative value storing unit to decide whether or not an abnormality depending on the change of the forward voltage of the semiconductor light sources is present.

When the plurality of semiconductor light sources are turned on, the forward voltages of the semiconductor light sources are respectively detected The relative values of the semiconductor light sources are calculated from the detected values. The initial value calculated by initially turning on the semiconductor light sources, of the calculated relative values is stored as the initial relative value or the latest relative value of the calculated relative values is stored as the updated relative value. The relative value calculated by turning on each of the semiconductor light sources is compared with the stored initial relative value or the updated relative value to decide whether or not the abnormality due to the change of the forward voltage of each of the semiconductor light sources is present. Accordingly, even when the forward voltage Vf of the semiconductor light sources is gradually lowered or suddenly lowered owing to the change of the environment of the semiconductor light sources, for instance, the change of temperature, the abnormality due to the change of the forward voltage of the semiconductor light sources can be highly accurately detected. Further, as the forward voltages of the semiconductor light sources, the relative values of the semiconductor light sources are calculated and the calculated relative values are compared with the stored initial relative value or the updated relative value. Accordingly, even when the forward voltage Vf is changed due to the change of temperature, whether or not the abnormality due to the change of the forward voltage of the semiconductor light sources is present can be accurately detected without considering the change of the forward voltage Vf owing to the change of temperature.

In one or more embodiments, in a lighting controller for a lighting device for a vehicle, the initial value storing unit stores as the initial value the detected value of the detected values of the forward voltage detecting unit when a first setting time elapses after the semiconductor light source is initially turned on and the first and second deciding units decide whether or not the abnormality is present when a second setting time elapses after the semiconductor light source is turned on.

The detected value obtained when the first setting time elapses after the semiconductor light source is initially turned on is stored as the initial value. The presence or absence of the abnormality is decided when the second setting time elapses after the semiconductor light source is turned on. Accordingly, the first setting time and the second setting time are set to meet a time when the semiconductor light source is in a stable state in view of temperature after the semiconductor light source is turned on. Thus, a detecting accuracy can be prevented from being deteriorated due to the change of the temperature of the semiconductor light source.

In one or more embodiments, in a lighting controller for a lighting device for a vehicle, the relative value calculating unit calculates the initial relative value when a first setting time elapses after the semiconductor light sources are respectively initially turned on and the deciding unit decides whether or not the abnormality is present when a second setting time elapses after the semiconductor light sources are respectively turned on.

The initial relative value is calculated when the first setting time elapses after the semiconductor light sources are respectively initially turned. The presence or absence of the abnormality is decided when the second setting time elapses after the semiconductor light sources are respectively turned on. Accordingly, the first setting time and the second setting time are set to meet a time when the semiconductor light sources are respectively in a stable state in view of temperature after the semiconductor light sources are turned on. Thus, a detecting accuracy can be prevented from being deteriorated due to the change of the temperature of the semiconductor light sources.

In one or more embodiments, a lighting controller for a lighting device for a vehicle further comprises: a temperature detecting unit for detecting the ambient temperature of the semiconductor light source; and a correcting unit for correcting the detected value of the forward voltage detecting unit in accordance with the detected temperature of the temperature detecting unit to set the corrected detected value to a true detected value.

The ambient temperature of the semiconductor light sources is detected, the detected value of the forward voltage is corrected and the corrected detected value is set to a true detected value. Accordingly, even when the ambient temperature of the semiconductor light sources is changed, the detected value of the forward voltage is corrected in accordance with the ambient temperature. Thus, even when the ambient temperature of the semiconductor light sources is changed, the abnormality can be highly accurately detected.

In one or more embodiments, in a lighting controller for a lighting device for a vehicle, when the current supply control unit performs a control deviating from a prescribed control condition, the first deciding unit or the second deciding unit stops a deciding operation or mitigates the condition of the first abnormality deciding value or the second abnormality deciding value.

When the current supply control unit performs a control deviating from a prescribed control condition, the first deciding unit or the second deciding unit stops a deciding operation for deciding whether or not the abnormality is present or mitigates the condition of the first abnormality deciding value or the second abnormality deciding value, so that a wrong decision can be prevented.

In one or more embodiments, in a lighting controller for a lighting device for a vehicle, when the current supply control unit performs a control deviating from a prescribed control condition, the deciding unit stops a deciding operation.

When the current supply control unit performs a control deviating from a prescribed control condition, the deciding unit stops a deciding operation for deciding whether or not the abnormality is present, so that a wrong decision can be prevented.

In one or more embodiments, a lighting controller for a lighting device for a vehicle further comprises: a temperature predicting unit for predicting the temperature of the semiconductor light source on the basis of the detected value of the forward voltage detecting unit, and the current supply control unit controls the current to the semiconductor light source in accordance with the predicted result of the temperature predicting unit.

The temperature of the semiconductor light source is predicted on the basis of the detected value of the forward voltage of the semiconductor light source, and the current to the semiconductor light source is controlled in accordance with the predicted result. Accordingly, only the forward voltage of the semiconductor light source is detected so that the current to the semiconductor light source can be controlled to meet the change of the temperature of the semiconductor light source without detecting the temperature of the semiconductor light source.

As apparent from the above-description, according to the lighting controller for a lighting device for a vehicle of one or more embodiments, the abnormality due to the fall of the forward voltage of a single or a plurality of semiconductor light sources can be highly accurately detected.

According to the lighting controller for a lighting device for a vehicle of one or more embodiments, the abnormality due to the fall of the forward voltage of the semiconductor light sources respectively can be highly accurately detected.

According to one or more embodiments, a detecting accuracy can be prevented from being lowered in accordance with the change of the temperature of the semiconductor light source.

According to one or more embodiments, a detecting accuracy can be prevented from being lowered in accordance with the change of the temperature of the semiconductor light source.

According to one or more embodiments, even when the ambient temperature of the semiconductor light source is changed, the abnormality can be highly accurately detected.

According to one or more embodiments, a wrong decision can be prevented.

According to one or more embodiments, a current to the semiconductor light source can be controlled to meet the change of the temperature of the semiconductor light source without detecting the temperature of the semiconductor light source only by detecting the forward voltage of the semiconductor light source.

Embodiments of the present invention may include one or more of the above aspects and advantages. Other aspects and advantages of the invention will be apparent from the following description and the appended claims.

BRIEF DESCRIPTION OF DRAWINGS

FIG. 4 is a circuit block diagram for a control circuit.

DETAILED DESCRIPTION

Figure 1:
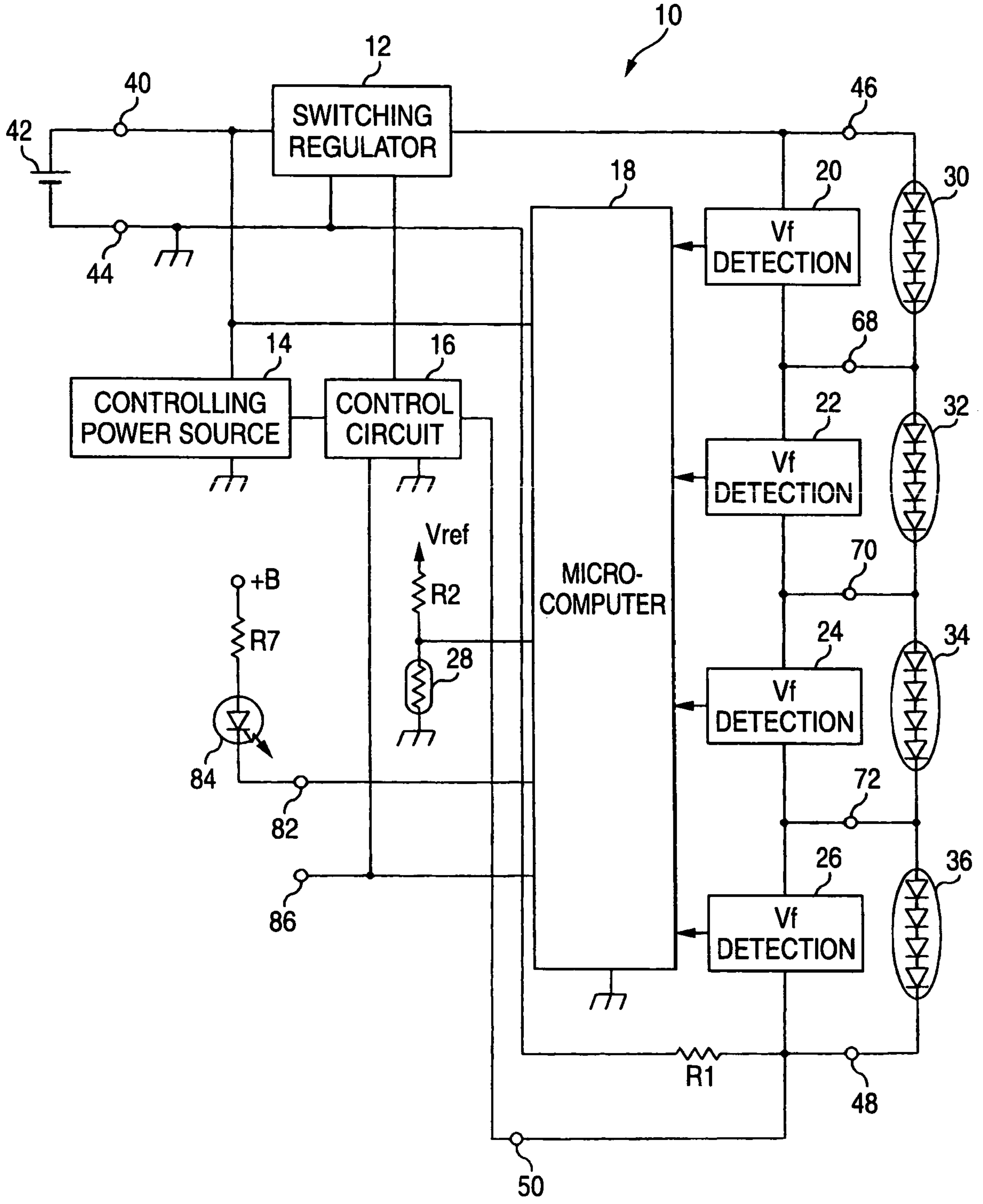
FIG. 1 is a circuit block diagram of a lighting controller for a lighting device for a vehicle showing one embodiment of the present invention.
Figure 2:
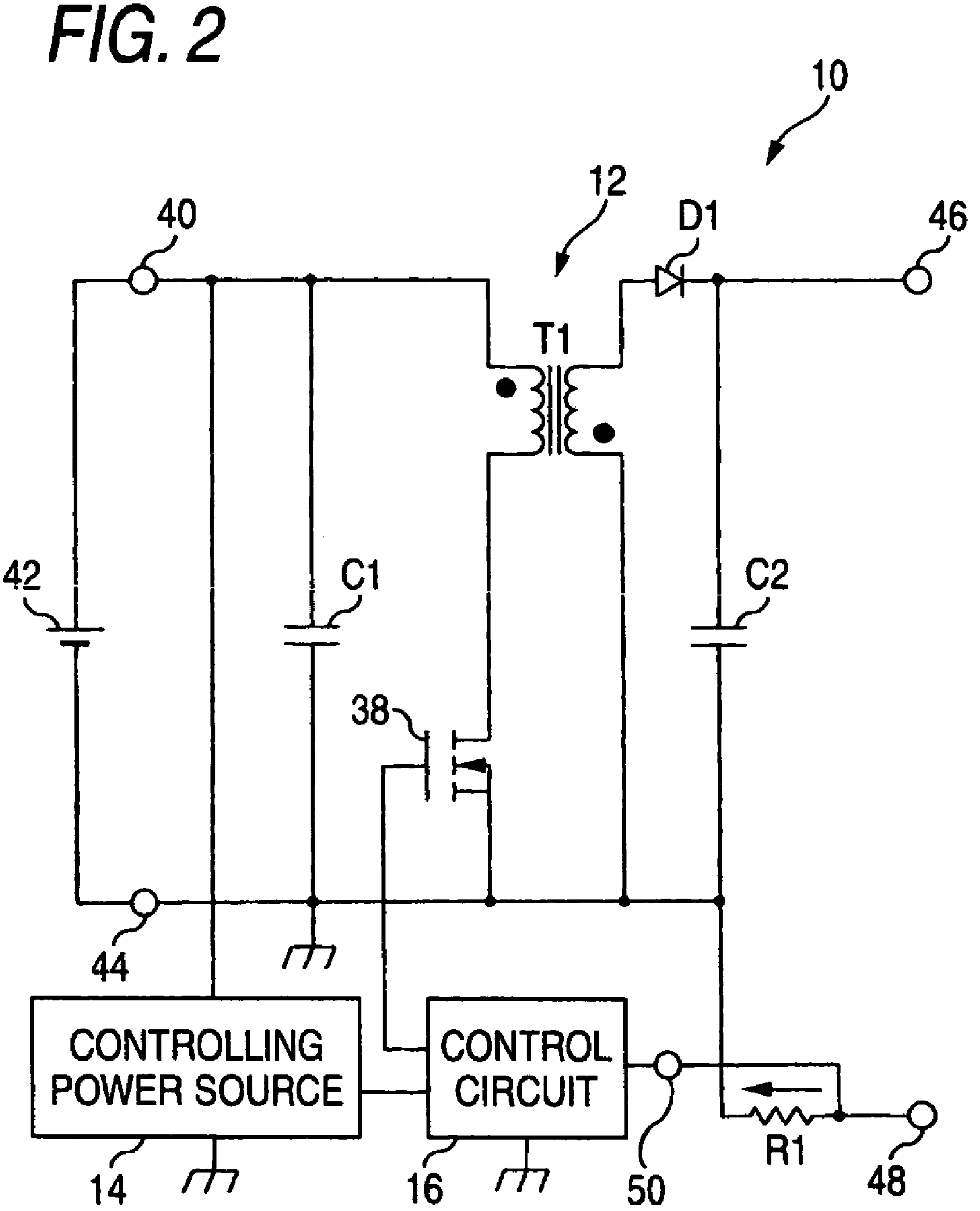
FIG. 2 is a block diagram for a circuit of a controlling power source.

Now, embodiments of the present invention will be described below. FIG. 1 is a circuit block diagram of a lighting controller for a lighting device for a vehicle showing one embodiment of the present invention. FIG. 2 is a block diagram for a circuit of a controlling power source.

Figure 3:
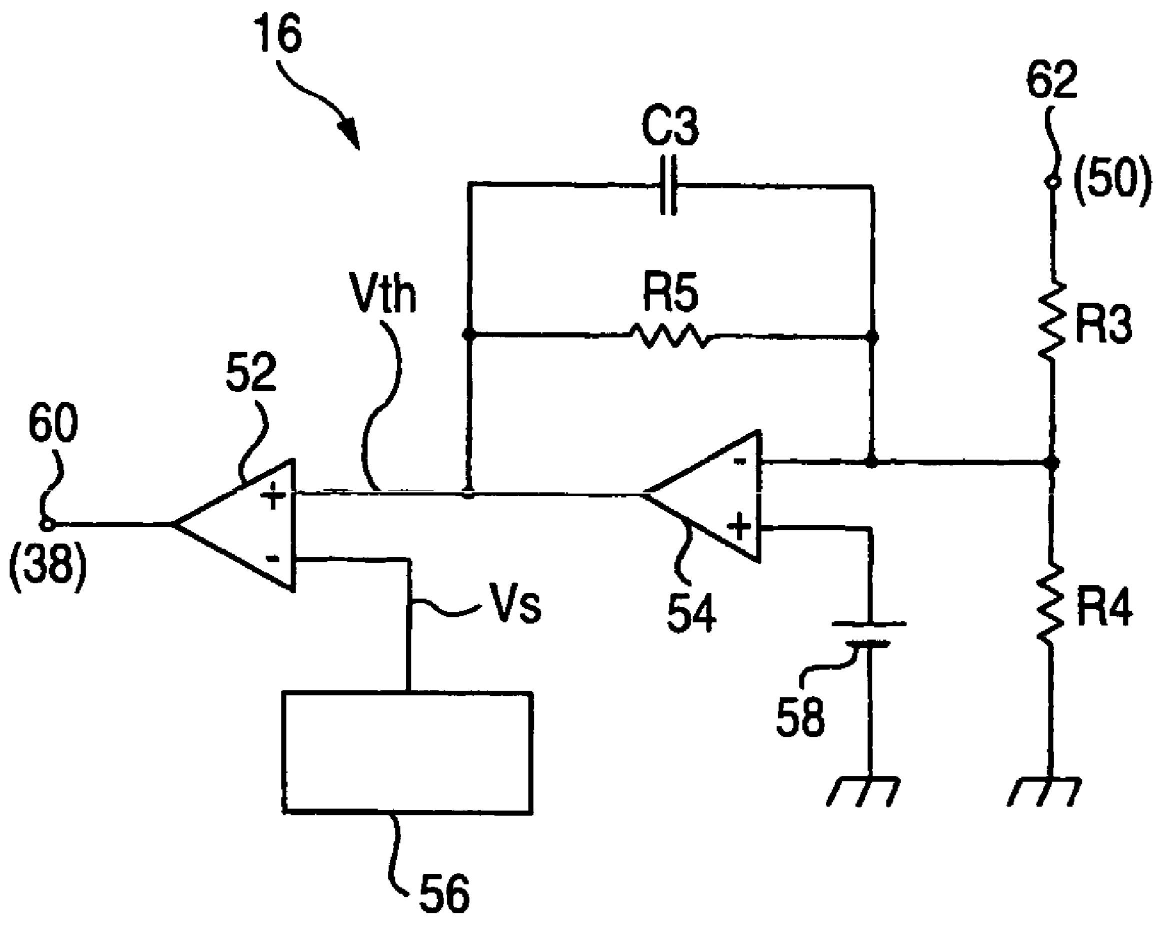
FIG. 3 is a circuit block diagram of a switching regulator.
Figure 5:
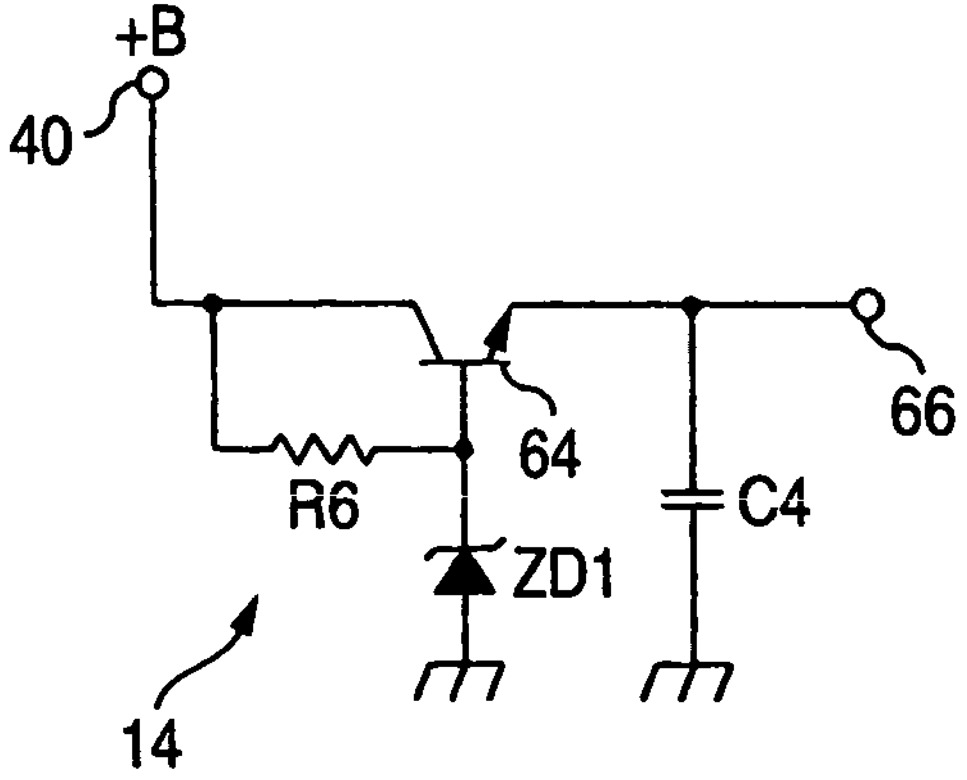
FIG. 5 is a wave form diagram for explaining the operation of the control circuit.
Figure 6:
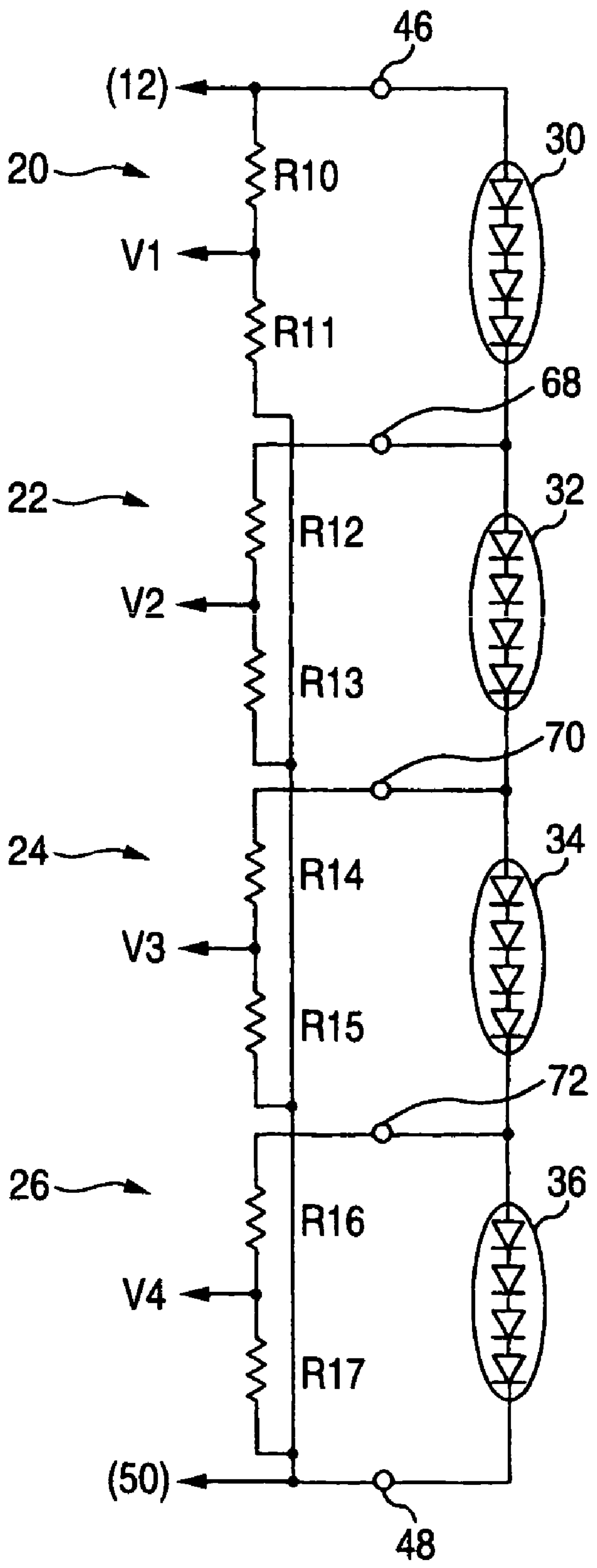
FIG. 6 is a circuit block diagram showing one example of a forward voltage detecting circuit.
Figure 7:
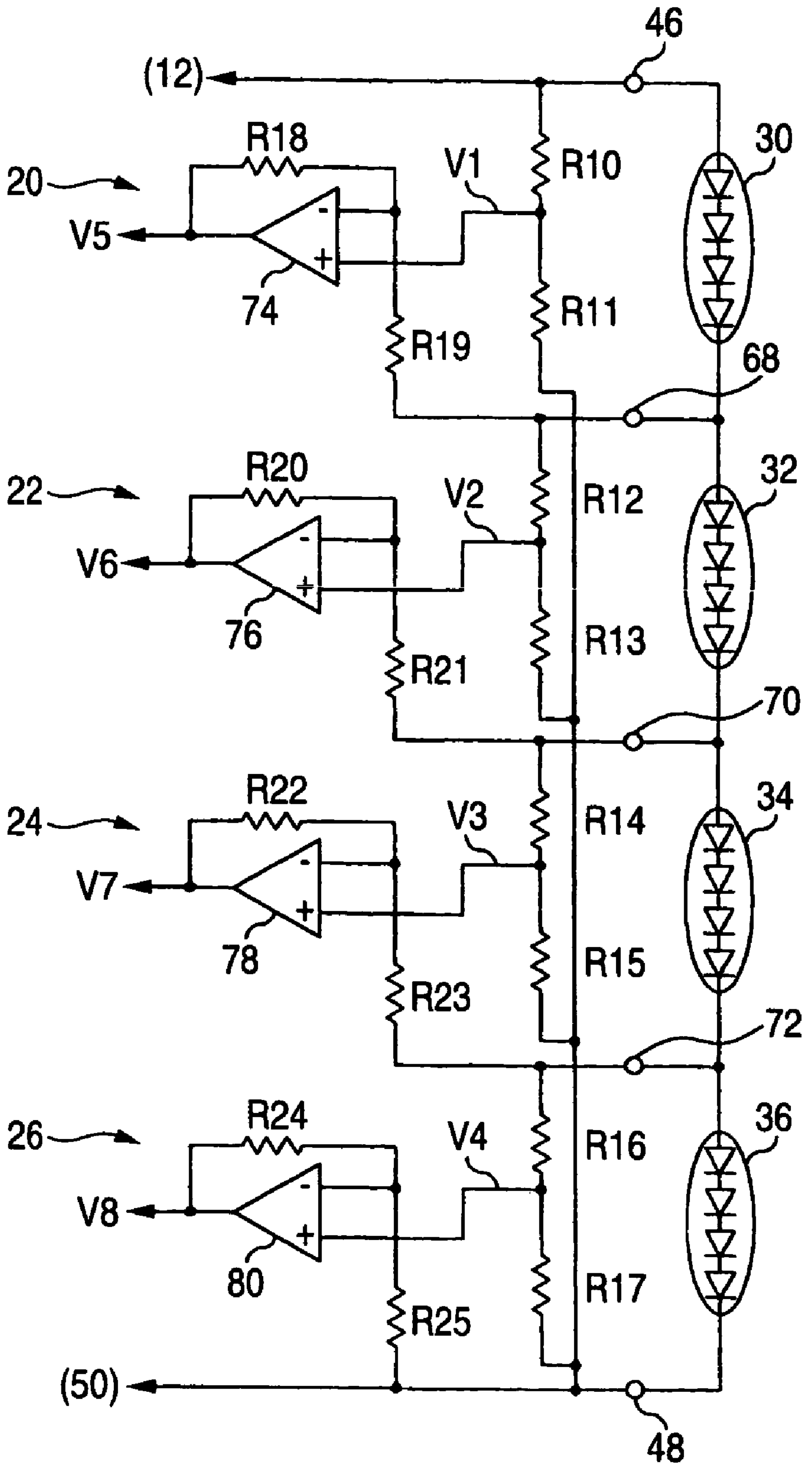
FIG. 7 is a circuit block diagram showing one example of the forward voltage detecting circuit.
Figure 8:
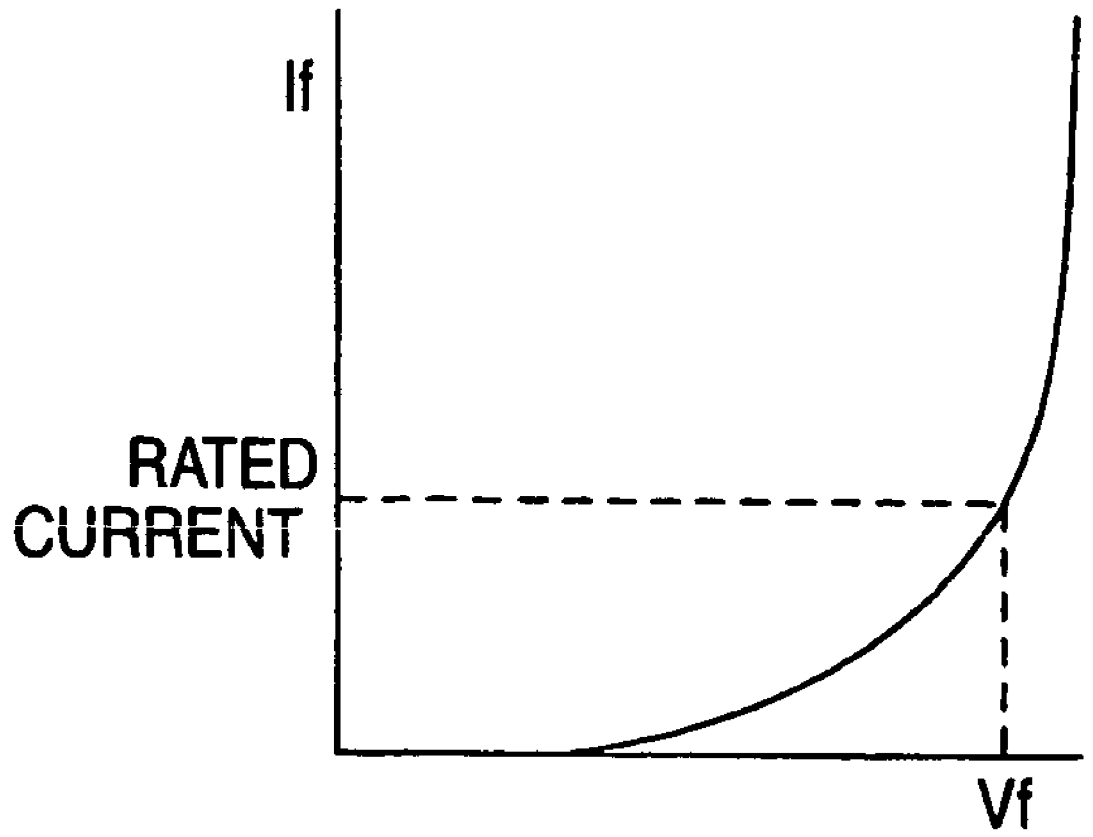
FIG. 8 is a characteristic view for explaining the Vf-If characteristics of an LED.
Figure 9:
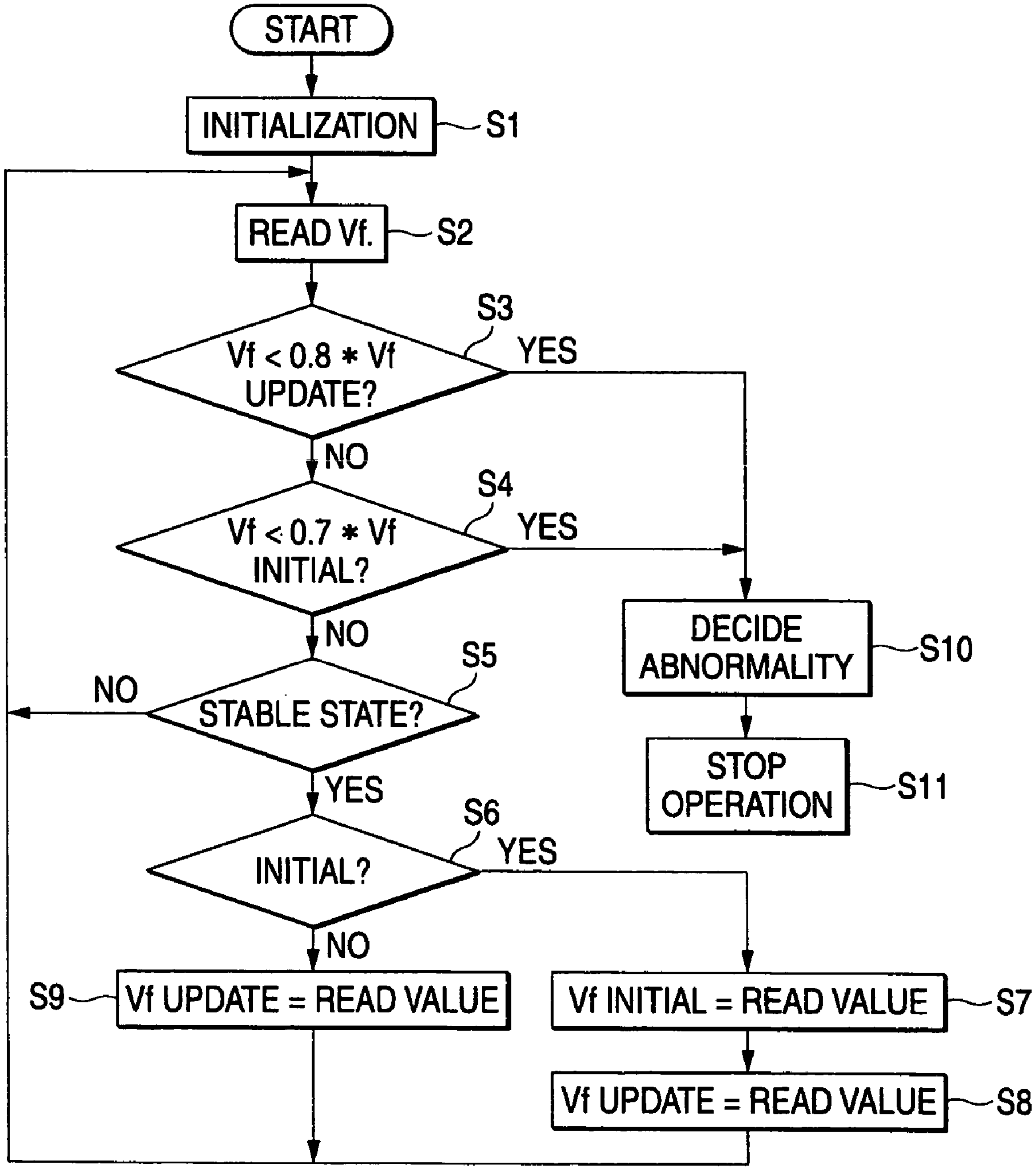
FIG. 9 is a flowchart for explaining the operation of the lighting controller for a lighting device for a vehicle shown in FIG. 1.
Figure 10:
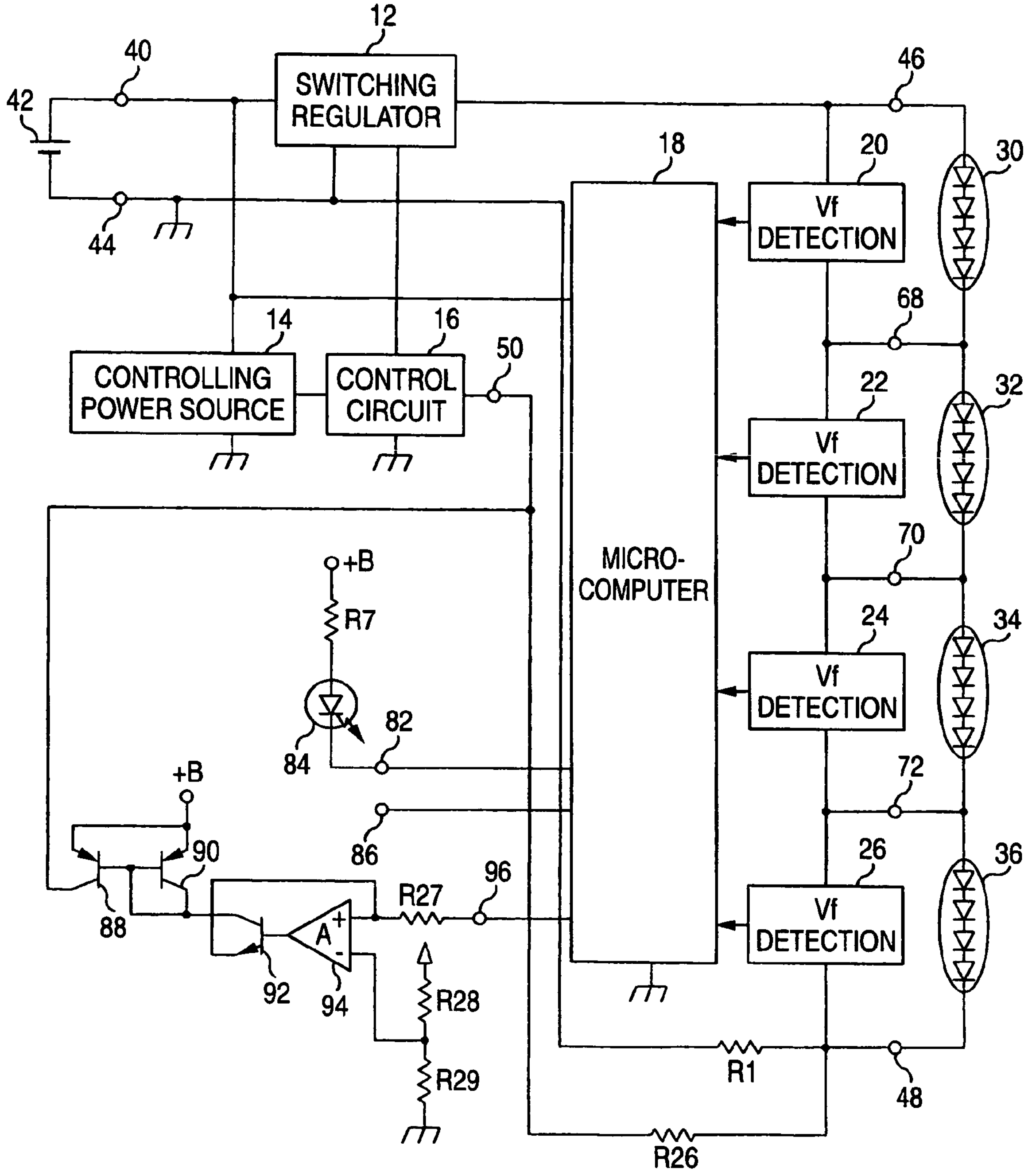
FIG. 10 is a circuit block diagram of a lighting controller for a lighting device for a vehicle showing one embodiment of the present invention.

FIG. 3 is a circuit block diagram showing a switching regulator. FIG. 4 is a circuit block diagram of a control circuit. FIG. 5 is a wave form diagram for explaining the operation of the control circuit. FIG. 6 is a circuit block diagram showing one example of a forward voltage detecting circuit. FIG. 7 is a circuit block diagram showing one example of the forward voltage detecting circuit. FIG. 8 is a characteristic view showing Vf-If characteristics of an LED. FIG. 9 is a flowchart for explaining the operation of the lighting controller for a lighting device for a vehicle shown in FIG. 1. FIG. 10 is a circuit block diagram of a lighting controller for a lighting device for a vehicle showing one embodiment of the present invention.

In the drawings, the lighting controller 10 for a lighting device for a vehicle includes, as one element of a lighting device (a light emitting device) for a vehicle as shown in FIG. 1, a switching regulator 12, a controlling power source 14, a control circuit 16, a microcomputer 18, forward voltage detecting circuits 20, 22, 24 and 26, a thermistor 28 and shunt resistances R1 and R2. To the switching regulator 12, multi-chip LEDs 30, 32, 34 and 36 are connected as loads. In the multi-chip LEDs 30 to 36 respectively, four LED chips that are connected together in series are accommodated in packages and the LEDs 30 to 36 are mutually connected in series to the output side of the switching regulator 12 as semiconductor light sources composed semiconductor light emitting elements.

As the multi-chip LEDs 30 to 36, a plurality of LEDs mutually connected in series may be used as a power source block. Power source blocks respectively connected in parallel may be used or a single multi-chip LED may be used. Further, a single, or a plurality of, single chip LEDs may be used in place of a single, or a plurality of, multi-chip LEDs. Further, the multi-chip LEDs 30 to 36 may be formed as various kinds of lighting devices for vehicles such as a head lamp, a stop and tail lamp, a fog lamp and a turn signal lamp.

As shown in FIG. 2, the switching regulator 12 includes a transformer T1, a condenser C1, an NMOS transistor 38, a diode D1 and a condenser C2. The condenser C1 is connected in parallel with a primary side of the transformer T1 and the NMOS transistor 38 is connected in series to the primary side of the transformer T1. One end side of the condenser C1 is connected to a positive terminal of a battery 42 to be mounted on a vehicle (a DC power source) through a power supply input terminal 40 and the other end side is connected to a negative terminal of the battery 42 to be mounted on a vehicle through a power supply input terminal 44 and grounded. The NMOS transistor 38 has a drain connected to the primary side of the transformer T1, a source grounded and a gate connected to control circuit 16. With the secondary side of the transformer T1, the condenser C2 is connected in parallel through the diode D1. A node of the diode D1 and the condenser C2 is connected to an anode side of the multi-chip LED 30 through an output terminal 46. One end side of the secondary side of the transformer T1 is grounded together with one end side of the condenser C2 and connected to a cathode side of the multi-chip LED 36 through the shunt resistance R1 and an output terminal 48. The output terminal 48 is connected to the control circuit 16 through a current detecting terminal 50. The shunt resistance R1 is formed as a current detecting unit for detecting a current supplied to the multi-chip LEDs 30 to 36.

Voltage generated at both the ends of the shunt resistance R1 is fed back to the control circuit 16 as the current of the multi-chip LEDs 30 to 36.

The NMOS transistor 38 is formed as a switching element turned on and off in response to an on/off signal (a switching signal) outputted from the control circuit 16. When the NMOS transistor 38 is turned on, an input voltage from the battery 42 to be mounted on a vehicle is accumulated in the transformer T1 as electromagnetic energy. When the NMOS transistor 38 is turned off, the electromagnetic energy accumulated in the transformer T1 is discharged to the multi-chip LEDs 30 to 36 as light emitting energy from the secondary side of the transformer T1 through the diode D1.

That is, the switching regulator 12 is constructed as a current supply control unit for receiving the supply of an electric power from the battery 42 to be mounted on a vehicle and controlling the supply of the current to the multi-chip LEDs 30 to 36 together with the control circuit 16. In this case, the switching regulator 12 compares the voltage of the current detecting terminal 50 with prescribed voltage to control an output current in accordance with the compared result.

Specifically, the control circuit 16 for controlling the switching regulator 12 includes, as shown in FIG. 3, a comparator 52, an error amplifier 54, a saw tooth wave generator 56, a reference voltage 58, resistances R3, R4 and R5 and a condenser C3. An output terminal 60 of the comparator 52 is directly connected to the gate of the NMOS transistor 38 or through a current amplifying preamplifier (not shown in the drawing). An input terminal 62 connected to one end of the resistance R3 is connected to the current detecting terminal 50. To the input terminal 62, voltage fed back from the current detecting terminal 50 is applied. The resistances R3 and R4 divide the voltage applied to the input terminal 62 to apply the voltage obtained by dividing the voltage to a negative input terminal of the error amplifier 54. The error amplifier 54 outputs voltage corresponding to the difference between the voltage applied to the negative input terminal and the reference voltage 58 to a positive input terminal of the comparator 52 as a threshold value Vth. The comparator 52 receives a saw tooth wave Vs to a negative input terminal from the saw tooth wave generator 56 to compare the saw tooth wave Vs with the threshold value Vth and outputs an on/off signal corresponding to the compared result to the gate of the NMOS transistor 38.

As shown in FIGS. 4(*a*) and 4(*b*), when the level of the threshold value Vth is located at a substantially intermediate part of the saw tooth wave Vs, the on/off signal of on duty as high as about 50% is outputted. On the other hand, when the level of the voltage fed back from the current detecting terminal 50 is lower than the reference voltage 58 as the output current of the switching regulator 12 is decreased, the level of the threshold value Vth by the output of the error amplifier 52 is high. Thus, as shown in FIGS. 4(*c*) and 4(*d*), the on/off signal of on duty higher than 50% is outputted from the comparator 52. As a result, the output current of the switching regulator 12 is increased.

On the contrary, when the level of the voltage fed back from the current detecting terminal 50 is higher than the reference voltage 58 as the output current of the switching regulator 12 is increased and the level of the threshold Vth by the output of the error amplifier 54 is lowered, the on/off signal of on duty lower than 50% is outputted from the comparator 52, as shown in FIGS. 4(*e*) and 4(*f*). As a result, the output current of the switching regulator 12 is decreased. A chopping wave generator for generating a chopping wave (a chopping wave signal) can be used in place of the saw-tooth wave generator 56.

Further, to the control circuit 16, the electric power is supplied from the controlling power source 14. The controlling power source 14 includes, as shown in FIG. 5, an NPN transistor 64 as a series regulator, a resistance R6, a Zener diode ZD1 and a condenser C4. A collector of the NPN transistor 64 is connected to the power supply input terminal 40 and an emitter is connected to the control circuit 16 through an output terminal 66. When a supply voltage is applied to the NPN transistor 64 from the power supply input terminal 40, the NPN transistor 64 outputs voltage corresponding to Zener voltage generated at both the ends of the Zener diode ZD1 to the control circuit 16 from the emitter through the output terminal 66.

The forward voltage detecting circuits 20, 22, 24 and 26 are respectively connected in parallel with both the ends of the multi-chip LEDs 30 to 36 and formed as forward voltage detecting units that detect forward voltage Vf (the total forward voltage of the four LED chips) generated at both the ends of the multi-chip LEDs 30 to 36 and output the detected result to the microcomputer 18.

As the forward voltage detecting circuits 20 to 26, for example, the forward voltage detecting circuits may be employed that have resistances R10, R11, R12, R13, R14, R15, R16 and R17 as shown in FIG. 6. The forward voltage detecting circuit 20 by the resistances R10 and R11 divides voltage between the output terminal 46 and the output terminal 48 by the resistances R10 and R11 to output voltage V1 obtained by dividing the voltage to the microcomputer 18. The forward voltage detecting circuit 22 by the resistances R12 and R13 divides voltage applied between a detecting terminal 68 and the output terminal 48 by the resistances R12 and R13 to output voltage V2 obtained by dividing the voltage to the microcomputer 18. The forward voltage detecting circuit 24 by the resistances R14 and R15 divides voltage applied between a detecting terminal 70 and the output terminal 48 by the resistances R14 and R15 to output voltage V3 obtained by dividing the voltage to the microcomputer 18. The forward voltage detecting circuit 26 by the resistances R16 and R17 divides voltage applied between a detecting terminal 72 and the output terminal 48 by the resistances R16 and R17 to output voltage V4 obtained by dividing the voltage to the microcomputer 18.

In this case, the voltage V1 designates the total forward voltage Vf of the four multi-chip LEDs 30 to 36. The voltage V2 designates the total forward voltage Vf of the three multi-chip LEDs 32, 34 and 36. The voltage V3 designates the total forward voltage Vf of the two multi-chip LEDs 34 and 36. The voltage V4 designates the forward voltage Vf of one multi-chip LED 36. Accordingly, after the voltages V1, V2, V3 and V4 are A/D (analog/digital) converted in the microcomputer 18, the differences between the voltages are respectively obtained so that the forward voltage Vf of each of the multi-chip LEDs 30, 32, 34 and 36 can be obtained.

Further, as the forward voltage detecting circuits 20 to 26, as shown in FIG. 7, the forward voltage detecting circuits may be used that include operation amplifiers 74, 76, 78 and 80 and resistances, R18, R19, R20, R21, R22, R23, R24, and R25 as well as the resistances R10 to R17. In the forward voltage detecting circuit 20 including the operation amplifier 74 and the resistances R10, R11, R18 and R19, the voltage V1 divided by the resistances R10 and R11 is inputted to a positive input terminal of the operation amplifier 74 and the voltage of the detecting terminal 68 is inputted to a negative input terminal of the operation amplifier 74 through the resistance R19 and, from the operation amplifier 74, voltage showing the difference between the voltage applied to the output terminal 46 and the voltage applied to the detecting terminal 68, that is, voltage V5 generated at both the ends of the multi-chip LED 30 is outputted as the forward voltage Vf.

Similarly, in the forward voltage detecting circuit 22 including the operation amplifier 76 and the resistances R12, R13 and R20 and R21, the voltage V2 divided by the resistances R12 and R13 is inputted to a positive input terminal of the operation amplifier 76 and the voltage of the detecting terminal 70 is inputted to a negative input terminal of the operation amplifier 76 through the resistance R21 and, from the operation amplifier 76, voltage showing the difference between the voltage applied to the detecting terminal 68 and the voltage applied to the detecting terminal 70, that is, voltage V6 generated at both the ends of the multi-chip LED 32 is outputted as the forward voltage Vf. In the forward voltage detecting circuit 24 including the operation amplifier 78 and the resistances R14, R15 and R22 and R23, the voltage V3 divided by the resistances R14 and R15 is inputted to a positive input terminal of the operation amplifier 78 and the voltage of the detecting terminal 72 is inputted to a negative input terminal of the operation amplifier 78 through the resistance R23 and, from the operation amplifier 78, voltage showing the difference between the voltage applied to the detecting terminal 70 and the voltage applied to the detecting terminal 72, that is, voltage V7 generated at both the ends of the multi-chip LED 34 is outputted as the forward voltage Vf. Further, in the forward voltage detecting circuit 26 including the operation amplifier 80 and the resistances R16, R17 and R24 and R25, the voltage V4 divided by the resistances R16 and R17 is inputted to a plus input terminal of the operation amplifier 80 and the voltage of the output terminal 48 is inputted to a minus input terminal of the operation amplifier 80 through the resistance R25 and, from the operation amplifier 80, voltage showing the difference between the voltage applied to the detecting terminal 72 and the voltage applied to the output terminal 48, that is, voltage V8 generated at both the ends of the multi-chip LED 36 is outputted as the forward voltage Vf.

In this case, the microcomputer 18 A/D converts the voltages V5, V6, V7 and V8 by an A/D converter or the like to obtain the forward voltage Vf generated at both the ends of each of the multi-chip LEDs 30, 32, 34 and 36.

The microcomputer 18 includes a CPU, a ROM, a RAM, an input and output circuit and the A/D converter and is formed as an updated value storing unit that sequentially fetches the voltages V1, V2, V3 and V4 or analog voltages related to the voltages V5, V6, V7 and V8 from the forward voltage detecting circuits 20, 22, 24 and 26, converts the analog voltages to digital data, obtains the detected values of the forward voltages Vf of the multi-chip LEDs 30 to 36 on the basis of the converted digital data, sequentially fetches and updates the detected values of the forward voltages Vf and sequentially stores the latest detected values as updated values. Further, the microcomputer 18 also serves as an initial value storing unit that stores the detected values of the forward voltages Vf as initial values when the multi-chip LEDs 30 to 36 are respectively initially turned on.

Further, the microcomputer 18 is formed as a first deciding unit that sets a first abnormality deciding value from the initial value, for example, the initial value of the forward voltage Vf×0.7 and compares the set first abnormality deciding value with the detected value of the forward voltage Vf to decide the change of the forward voltage Vf of each of the multi-chip LEDs 30 to 36, specifically, whether or not an abnormality is present depending on the fall of the forward voltage Vf. Still further, the microcomputer 18 also serves as a second deciding unit that sequentially sets second abnormality deciding values having conditions different from those of the first abnormality deciding values in accordance with the stored updated values, for instance the second abnormality deciding values (=the detected values of the forward voltage Vf×0.8) having conditions stricter than those of the first abnormality deciding values and compares the set second abnormality deciding values with the detected values of the forward voltage Vf to decide the change of the forward voltage Vf of each of the multi-chip LEDs 30 to 36, specifically, whether or not an abnormality is present depending on the fall of the forward voltage Vf.

Further, the microcomputer 18 stores a detected value as an initial value when a first setting time, for example, 5 minutes elapses after the multi-chip LEDs are initially turned on to decide whether or not the abnormality exists under a state that the multi-chip LEDs 30 to 36 are thermally stable, or decides whether or not the abnormality exists when a second setting time, for example, 5 minutes or more elapses after each turning on operation during the processes of repeating turning on and off operations for the multi-chip LEDs 30 to 36.

When the microcomputer 18 decides whether or not the abnormality is present, the microcomputer outputs the decided result to a terminal 82. For example, when the microcomputer 18 decides that the abnormality is present, the microcomputer outputs a signal of a low level to the terminal 82. When the microcomputer 18 decides that the abnormality is not present, the microcomputer outputs a signal of a high level to the terminal 82. To the terminal 82, an LED 84 disposed in the view of a driver's seat is connected. An anode side of the LED 84 is connected to the positive terminal of the battery 42 to be mounted on a vehicle through a resistance R7. When the microcomputer 18 decides that the abnormality is present, the LED 84 emits light to inform a driver that the abnormality is present.

When a switch for extinctive lighting is operated by the operation of the driver, a signal from the switch is inputted to a terminal 86 of the microcomputer 18. When a signal for commanding the lighting to be turned off is inputted to the terminal 86, the control circuit 16 performs a control for supplying the current smaller than a prescribed current to the multi-chip LEDs 30 to 36 as a control deviating prescribed control conditions. Namely, when the vehicle stops or the ambient temperature is high, the control circuit 16 shifts to a control for supplying the current smaller than the prescribed current to prevent the temperature of the multi-chip LEDs 30 to 36 from rising or to save energy. In this case, since the forward voltage Vf of the multi-chip LEDs 30 to 36 is lower than that at the time of a rated current as shown in FIG. 8, when it is directly decided whether or not the abnormality is present in the forward voltage Vf, there is a concern that the forward voltage Vf is erroneously decided to be abnormal, though the forward voltage is normal.

Thus, when the control circuit 16 performs the control deviating the prescribed conditions, the microcomputer 18 stops an operation for deciding whether or not the abnormality is present, or relieves the conditions of the first abnormality deciding value or the second abnormality deciding value.

Further, the microcomputer 18 also serves as a correcting unit that fetches the voltage at both the ends of the thermistor 28 as a temperature detecting unit for detecting the ambient temperature of the multi-chip LEDs 30 to 36 and correcting the detected value of the forward voltage Vf in accordance with the voltage to set the corrected detected value as a true detected value.

Now, the specific operation of the microcomputer 18 will be described below with reference to a flowchart shown in FIG. 9.

When the microcomputer 18 is activated as the power source is turned on, the microcomputer 18 initializes a time for deciding a stable state, for instance, 5 minutes (step S1). After that, the microcomputer 18 reads the voltage V1 or V5 as the forward voltage Vf from the forward voltage detecting circuit 20 of the forward voltage detecting circuits 20 to 26 (step S2) to decide whether or not the read forward voltage Vf is smaller than 0.8×a Vf updated value (the second abnormality deciding value) or 0.7×a Vf initial value (the first abnormality deciding value) (steps S3, S4). In this case, since the first abnormality deciding value and the second abnormality deciding value are not set immediately after the microcomputer is activated, it is decided whether or not the LED is in a stable state (step S5). That is, the microcomputer 18 decides whether or not 5 minutes elapses after the multi-chip LED 30 starts to be turned on during initially turning on the multi-chip LED 30 or during subsequently turning on the multi-chip LED 30. When five minutes elapses, the microcomputer 18 decides that the stable state is obtained to decide whether or not the multi-chip LED 30 is initially turned on (step S6). When the multi-chip LED 30 is initially turned on, the microcomputer 18 stores the read value as the Vf initial value and sets the first abnormality deciding value=0.7×the Vf initial value from the stored VF initial value (step S7). Further, the microcomputer 18 stores the latest read value (the detected value) of the read values as the updated value and sets the second abnormality deciding value (=0.8×the Vf updated value) having conditions different from those of the first abnormality deciding value in accordance with the stored Vf updated value. That is, the microcomputer 18 sets the second abnormality deciding value stricter than the first abnormality deciding value (the first abnormality deciding value is looser than the second abnormality deciding value) (step S8).

Subsequently, the microcomputer 18 returns to the process of the step S2 to sequentially read the outputs of the forward voltage detecting circuit 20 and decides whether or not the read Vf (the forward voltage) is smaller than the second abnormality deciding value=0.8×the Vf updated value or the first abnormality deciding value=0.7×Vf initial value (the steps S3, S4). At this time, when the microcomputer 18 decides that the read Vf is not abnormal, the microcomputer omits the processes of the steps S5 and S6. Then, in step S9, the microcomputer 18 sets the read value to the Vf updated value to store the set Vf updated value and updates the second abnormality deciding value=0.8×the Vf updated value in accordance with the stored VI updated value (step S9). After that, the microcomputer 18 returns again to the process of the step S2 to sequentially read the outputs of the forward voltage detecting circuit 20 and repeat the processes of the steps S3, S4, S5, S6 and S9 in accordance with the elapse of time. During the processes, when the microcomputer 18 decides that the LED 30 is in an abnormal state in either the step S3 or the step S4, the microcomputer 18 sets the output terminal 82 to a low level (step S10). Thus, the LED 84 is turned on so that the microcomputer can inform a user of the generation of the abnormality in the multi-chip LED 30. Then, the microcomputer 18 stops an operation for deciding whether or not the multi-chip LED 30 is abnormal to finish the processes in this routine (step S11).

In the processes shown in FIG. 9, as described above, the microcomputer 18 sequentially reads the outputs of the forward voltage detecting circuit 20 to decide whether or not the multi-chip LED 30 is abnormal. Further, the microcomputer 18 sequentially reads the outputs of the forward voltage detecting circuits 22, 24 and 26 and performs the same processes so that the microcomputer 18 can decide whether or not the multi-chip LEDs 32, 34 and 36 are abnormal.

According to this embodiment, the first abnormality deciding value is compared with the detected value of the forward voltage Vf to decide whether or not there is an abnormality owing to the fall of the forward voltage Vf of the multi-chip LEDs 30 to 36. Further, the second abnormality deciding values having the conditions different from those of the first abnormality deciding value in accordance with the stored updated value and the set second abnormality deciding values are compared with the detected values of the forward voltage Vf to decide whether or not there is an abnormality owing to the fall of the forward voltage Vf of the multi-chip LEDs 30 to 36. Therefore, even when the forward voltage Vf of the multi-chip LEDs 30 to 36 is gradually lowered or suddenly lowered, the abnormality due to the fall of the forward voltage Vf of the multi-chip LEDs 30 to 36 can be highly accurately detected by deciding whether the detected value of the forward voltage Vf deviates from the first abnormality deciding value or deviates from the second abnormality deciding value.

Further, in this embodiment, since the first abnormality deciding value is set more loosely than the second abnormality deciding value, it can be decided that the forward voltage Vf of the multi-chip LEDs 30 to 36 gradually progressively falls in accordance with the first abnormality deciding value. The second abnormality deciding value makes it possible to decide that the forward voltage Vf of the multi-chip LEDs 30 to 36 to suddenly fall.

Still further, in this embodiment, when the microcomputer 18 decides whether or not the multi-chip LEDs 30 to 36 are abnormal, the microcomputer 18 stores the Vf initial value or the Vf updated value with the lapse of time of a stable state after the multi-chip LEDs 30 to 36 start to be turned on, for example, with the lapse of 5 minutes or decides whether or not there is an abnormality. Thus, the microcomputer 18 can decide whether or not there is an abnormality under a state that the temperature conditions of the multi-chip LEDs 30 to 36 are uniform. Namely, when the read value of the forward voltage is stored or whether or not the abnormality exists is decided at the beginning of lighting when the multi-tip LEDs start to be turned on, a range of −40° C. to 150° C. needs to be considered as the temperature of the multi-chip LEDs 30 to 36. However, when the read value is stored or the presence or absence of the abnormality is decided after the multi-chip LEDs are in a stable state in view of temperature, the low temperature does not need to be considered and a detecting accuracy is the more improved.

Further, when the VF initial value is stored, since the Vf initial value may be stored once under the stable state after the multi-chip LEDs are initially turned on, a flag is allowed to stand when the VF initial value is firstly stored, so that the process can be rapidly carried out. When the multi-chip LEDs 30 to 36 are exchanged by, for instance, a dealer or the like, the flag is reset so that a Vf initial value for the exchanged multi-chip LED can be set.

In this embodiment, as described above, the microcomputer 18 compares the read value of the forward voltage Vf with the first abnormality deciding value or the second abnormality deciding value. However, the microcomputer 18 may be formed with a relative value calculating unit for calculating relative values of the multi-chip LEDs 30, 32, 34 and 36 from the detected values of the forward voltage Vf by the outputs of the forward voltage detecting circuits 20 to 26, a relative value storing unit for storing an initial relative value of the relative values calculated by the relative value calculating unit that is calculated as an initial value when the multi-chip LEDs 30 to 36 are initially turned on or an updated relative value (the latest updated value) obtained by sequentially updating the calculated relative values, and a deciding unit for comparing the calculated values of the relative value calculating unit with the initial relative value or the updated relative value stored in the relative value storing unit to decide the change of the forward voltage Vf of the multi-chip LEDs 30, 32, 34 and 36, specifically, the presence or absence of the abnormality due to the fall of the forward voltage Vf.

In this case, the relative value calculating unit by the microcomputer 18 can employ a structure in which the initial relative value is calculated when a first setting time, for example, 5 minutes elapses after the multi-chip LEDs 30 to 36 are initially turned on. Further, the deciding unit by the microcomputer 18 can employ a structure in which whether or not the abnormality is present is decided with a lapse of a second setting time, for example, with a lapse of 5 minutes or more after the multi-chip LEDs are respectively turned on during the processes of repeating operations for turning on and off the multi-chip LEDs 30, 32, 34 and 36. Still further, the deciding unit by the microcomputer 18 stops a deciding operation when the control circuit 16 performs a control deviating a prescribed control condition, so that the microcomputer can prevent a wrong decision.

In the microcomputer 18, when the structure is employed in which the relative values of the multi-chip LEDs 30 to 36 are calculated as the forward voltage Vf of the multi-chip LEDs 30 to 36, the calculated relative values are compared with the stored initial relative value or the updated relative value to decide the presence or absence of the abnormality due to the fall of the forward voltage Vf of the multi-chip LEDs 30 to 36, the abnormality due to the fall of the forward voltage Vf of the multi-chip LEDs 30 to 36 can be highly accurately detected without considering the variation of the forward voltage Vf due to a temperature change.

The microcomputer 18 may have a PWM function of the control circuit 16. Further, the microcomputer located in a vehicle side outside the lighting device may include a storing unit or a setting unit to make a decision by a communication.

Now, another embodiment of the present invention will be described by referring to FIG. 10. In this embodiment, as an auxiliary control circuit for controlling the output current of a switching regulator 12, a resistance R26 is inserted between a current detecting terminal 50 and an output terminal 48, and between the current detecting terminal 50 and an output terminal 98 of a microcomputer 18, PNP transistors 88, 90, an NPN transistor 92, an operation amplifier 94, and resistances R27, R28 and R29 are provided. In the microcomputer 18, the temperature of multi-chip LEDs 30 to 36 is predicted on the basis of a stored Vf initial value, a Vf updated value or a read value of Vf and an analog voltage based on the predicted result is outputted to a plus input terminal of the operation amplifier 94 through the resistance R27. Namely, the light fluxes of the multi-chip LEDs 30 to 36 have the same current, however, decrease at high temperature as their characteristics. Accordingly, as the temperature of the multi-chip LEDs 30 to 36 becomes higher, a current supplied to the multi-chip LEDs 30 to 36 is increased to prevent a light source from being dark.

Specifically, as the predicted result of the temperature of the multi-chip LEDs 30 to 36, as the temperature becomes higher, a higher analog voltage is outputted from the output terminal 96 of the microcomputer 18. The voltage of the output terminal 96 is applied to the positive input terminal of the operation amplifier 94 through the resistance R27. To the negative input terminal of the operation amplifier 94, a voltage divided by the resistances R28 and R29 is applied. The voltage obtained by dividing the voltage by the resistances R28 and R29 is set as a reference voltage meeting the temperature for preventing a thermo-runaway. When the voltage of the positive input terminal of the operation amplifier 94 is lower than the reference voltage of the negative input terminal, a current from the PNP transistors 88 and 90 forming a current mirror circuit is supplied through the NPN transistor 92 and the resistance R27 and supplied through a resistance R26 and a shunt resistance R1.

When the voltage of the output terminal 96 is gradually boosted in accordance with the rise of the temperature of the multi-chip LEDs 30 to 36, a current smaller than that at low temperature is supplied to the current mirror circuit. On the contrary, when the voltage of the output terminal 96 is lowered in accordance with the fall of the temperature of the multi-chip LEDs 30 to 36, a current larger than that at high temperature is supplied to the current mirror circuit. At this time, one current of the current mirror circuit flows from the PNP transistor 90 through the NPN transistor 92 and the resistance R27, and the other current is supplied to the resistance R26 and the shunt resistance R1 from the PNP transistor 88.

When the voltage of the output terminal 96 is gradually boosted in accordance with the rise of the temperature of the multi-chip LEDs 30 to 36, the current supplied to the current mirror circuit is gradually decreased. As a result, the current supplied to the resistance R26 and the shunt resistance R1 from the PNP transistor 88 is also gradually decreased. At this time, a control circuit 16 performs a control for gradually increasing the output current of the switching regulator 12 as the current acting on the resistance R26 is further decreased (as an ambient temperature becomes higher) so as to make the voltage of the current detecting terminal 50 constant. Thus, even when the forward voltage Vf of the multi-chip LEDs 30 to 36 falls at the high temperature due to the rise of the temperature of the multi-chip LEDs 30 to 36, the current supplied to the multi-chip LEDs 30 to 36 is increased more than that at the low temperature, so that the light fluxes of the multi-chip LEDs 30 to 36 can be prevented from being lowered.

According to this embodiment, the temperature of the multi-chip LEDs 30 to 36 can be predicted from the forward voltage Vf of the multi-chip LEDs 30 to 36 without providing a temperature sensor for detecting the temperature of the multi-chip LEDs 30 to 36, the output current of the switching regulator 12 can be controlled in accordance with the predicted result and the fluxes of the multi-chip LEDs 30 to 36 can be prevented from being lowered at the time of high temperature.

When the voltage of the positive input terminal of the operation amplifier 94 is higher than the reference voltage of the negative input terminal of the operation amplifier, the current is not supplied to the current mirror circuit and the current from the current mirror circuit does not act on the resistance R26. The control circuit 16 shifts a control for supplying a prescribed current to the multi-chip LEDs 30 to 36 so that the control circuit 16 can restrain the output current of the switching regulator 12 from being increased more than the prescribed current and prevent the thermo-runaway.

In the above-described embodiments, the forward voltages Vf of the multi-chip LEDs 30 to 36 are respectively detected. However, a structure may be employed in which the entire forward voltage Vf (=total forward voltage Vf) of the multi-chip LEDs 30 to 36 is detected.

In the above-described embodiments, the rise of the forward voltage may be detected when an LED having an electrostatic protecting element is opened or when an impedance component is increased in a constant current circuit.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS AND SIGNS

10 lighting controller for a lighting device for a vehicle
12 switching regulator
14 controlling power source
16 control circuit
18 microcomputer
20, 22, 24, 26 forward voltage detecting circuit
30, 32, 34, 36 multi-chip LED

What is claimed is:

1. A lighting controller for a lighting device for a vehicle comprising:

a current supply control unit for receiving a supply of an electric power from a power source and controlling a supply of a current to a semiconductor light source;

a forward voltage detecting unit for detecting values of a forward voltage of the semiconductor light source;

an initial value storing unit for storing as an initial value a detected value from the forward voltage detecting unit that is obtained when the semiconductor light source is initially turned on;

an updated value storing unit for storing a latest detected value of detected values from the forward voltage detecting unit as an updated value;

a first deciding unit for comparing a first abnormality deciding value set from the initial value with a detected value from the forward voltage detecting unit to decide whether or not an abnormality depending on a change of the forward voltage of the semiconductor light source is present; and a second deciding unit for setting a second abnormality deciding value having a condition different from that of the first abnormality deciding value in accordance with the updated value stored in the updated value storing unit and comparing the set second abnormality deciding value with a detected value from the forward voltage detecting unit to decide whether or not an abnormality depending on a change of the forward voltage of the semiconductor light source is present.

2. A lighting controller for a lighting device for a vehicle according to claim 1, wherein the initial value storing unit stores as the initial value a detected value of detected values from the forward voltage detecting unit when a first setting time elapses after the semiconductor light source is initially turned on and the first and second deciding units decide whether or not the abnormality is present when a second setting time elapses after the semiconductor light source is turned on.

3. A lighting controller for a lighting device for a vehicle according to claim 2, further comprising:

a temperature detecting unit for detecting an ambient temperature of the semiconductor light source; and a correcting unit for correcting detected values from the forward voltage detecting unit in accordance with the detected temperature of the temperature detecting unit to set the corrected detected value to a true detected value.

4. A lighting controller for a lighting device for a vehicle according to claim 2, wherein when the current supply control unit performs a control deviating from a prescribed control condition, the first deciding unit or the second deciding unit stops a deciding operation or mitigates a condition of the first abnormality deciding value or the second abnormality deciding value.

5. A lighting controller for a lighting device for a vehicle according to claim 2, further comprising:

a temperature predicting unit for predicting a temperature of the semiconductor light source based on of detected values of the forward voltage detecting unit, wherein the current supply control unit controls the current to the semiconductor light source in accordance with the predicted result of the temperature predicting unit.

6. A lighting controller for a lighting device for a vehicle according to claim 1, further comprising:

a temperature detecting unit for detecting an ambient temperature of the semiconductor light source; and a correcting unit for correcting detected values from the forward voltage detecting unit in accordance with the detected temperature of the temperature detecting unit to set the corrected detected value to a true detected value.

7. A lighting controller for a lighting device for a vehicle according to claim 6, wherein when the current supply control unit performs a control deviating from a prescribed control condition, the first deciding unit or the second deciding unit stops a deciding operation or mitigates a condition of the first abnormality deciding value or the second abnormality deciding value.

8. A lighting controller for a lighting device for a vehicle according to claim 6, further comprising:

a temperature predicting unit for predicting a temperature of the semiconductor light source based on of detected values of the forward voltage detecting unit, wherein the current supply control unit controls the current to the semiconductor light source in accordance with the predicted result of the temperature predicting unit.

9. A lighting controller for a lighting device for a vehicle according to claim 1, wherein when the current supply control unit performs a control deviating from a prescribed control condition, the first deciding unit or the second deciding unit stops a deciding operation or mitigates a condition of the first abnormality deciding value or the second abnormality deciding value.

10. A lighting controller for a lighting device for a vehicle according to claim 9, further comprising:

a temperature predicting unit for predicting a temperature of the semiconductor light source based on of detected values of the forward voltage detecting unit, wherein the current supply control unit controls the current to the semiconductor light source in accordance with the predicted result of the temperature predicting unit.

11. A lighting controller for a lighting device for a vehicle according to claim 1, further comprising:

a temperature predicting unit for predicting a temperature of the semiconductor light source based on detected values from the forward voltage detecting unit, wherein the current supply control unit controls the current to the semiconductor light source in accordance with the predicted result of the temperature predicting unit.

12. A lighting controller for a lighting device for a vehicle comprising:

a current supply control unit for receiving a supply of an electric power from a power source and controlling the supply of a current to a plurality of semiconductor light sources;

a forward voltage detecting unit for detecting respectively the forward voltages of the semiconductor light sources;

a relative value calculating unit for calculating relative values of the semiconductor light sources from detected values from the forward voltage detecting unit, and calculating the initial relative value when a first setting time elapses after the semiconductor light sources are respectively initially turned on;

a relative value storing unit for storing an initial relative value calculated as an initial value upon initially turning on the semiconductor light sources of the relative values calculated by the relative value calculating unit or an updated relative value calculated as a latest relative value of the relative values calculated by the relative value calculating unit; and a deciding unit for comparing the relative values calculated by the relative value calculating unit with the initial relative value or the updated relative value stored in the relative value storing unit to:

decide whether or not an abnormality depending on a change of the forward voltage of the semiconductor light sources is present, and decide whether or not the abnormality is present when a second setting time elapses after the semiconductor light sources are respectively turned on.

13. A lighting controller for a lighting device for a vehicle according to claim 12, wherein when the current supply control unit performs a control deviating from a prescribed control condition, the deciding unit stops a deciding operation.

14. A lighting controller for a lighting device for a vehicle according to claim 13, further comprising:

a temperature predicting unit for predicting a temperature of the semiconductor light source based on of detected values of the forward voltage detecting unit, wherein the current supply control unit controls the current to the semiconductor light source in accordance with the predicted result of the temperature predicting unit.

15. A lighting controller for a lighting device for a vehicle according to claim 12, further comprising:

a temperature predicting unit for predicting a temperature of the semiconductor light source based on of detected values of the forward voltage detecting unit, wherein the current supply control unit controls the current to the semiconductor light source in accordance with the predicted result of the temperature predicting unit.

16. A lighting controller for a lighting device for a vehicle comprising:

a current supply control unit for receiving a supply of an electric power from a power source and controlling the supply of a current to a plurality of semiconductor light sources;

a forward voltage detecting unit for detecting respectively the forward voltages of the semiconductor light sources;

a relative value calculating unit for calculating relative values of the semiconductor light sources from detected values from the forward voltage detecting unit;

a relative value storing unit for storing an initial relative value calculated as an initial value upon initially turning on the semiconductor light sources of the relative values calculated by the relative value calculating unit and an updated relative value calculated as a latest relative value of the relative values calculated by the relative value calculating unit; and a deciding unit for comparing the relative values calculated by the relative value calculating unit with the initial relative value or the updated relative value stored in the relative value storing unit to decide whether or not an abnormality depending on a change of the forward voltage of the semiconductor light sources is present;

a temperature predicting unit for predicting a temperature of the semiconductor light source based on of detected values of the forward voltage detecting unit, wherein the current supply control unit controls the current to the semiconductor light source in accordance with the predicted result of the temperature predicting unit.

17. A lighting controller for a lighting device for a vehicle comprising:

a current supply control unit for receiving electric power from a power source and controlling a supply of current to a semiconductor light source;

a forward voltage detecting unit for detecting a present value of a forward voltage of the semiconductor light source;

an initial value storing unit for storing as an initial value the present value of the forward voltage detected by the forward voltage detecting unit when the semiconductor light source is initially turned on;

an updated value storing unit for storing as an updated value the present value of the forward voltage detected by the forward voltage detecting unit at a time after when the semiconductor light source is initially turned on;

a first deciding unit for setting a first abnormality deciding value in accordance with the initial value and comparing the first abnormality deciding value with the present value of the forward voltage detected by the forward voltage detecting unit to determine whether an abnormality is present; and a second deciding unit for setting a second abnormality deciding value having a condition different from that of the first abnormality deciding value in accordance with the updated value and comparing the second abnormality deciding value with the present value of the forward voltage detected by the forward voltage detecting unit to determine whether an abnormality is present.

18. A method of controlling a lighting device for a vehicle comprising:

controlling a supply of current to a semiconductor light source;

detecting a present value of a forward voltage of the semiconductor light source;

storing as an initial value the present value of the forward voltage detected by the forward voltage detecting unit when the semiconductor light source is initially turned on;

storing as an updated value the present value of the forward voltage detected by the forward voltage detecting unit at a time after when the semiconductor light source is initially turned on;

setting a first abnormality deciding value in accordance with the initial value;

setting a second abnormality deciding value having a condition different from that of the first abnormality deciding value in accordance with the updated value; and comparing the first abnormality deciding value and the second abnormality deciding value with the present value of the forward voltage; and determining whether an abnormality is present based on the comparing of the first abnormality deciding value and the second abnormality deciding value with the present value of the forward voltage.

* * * * *